United States Patent
Collette et al.

(10) Patent No.: US 6,921,801 B2
(45) Date of Patent: Jul. 26, 2005

(54) METHOD FOR PREPARING WATER-SOLUBLE ACRYLIC COPOLYMERS

(75) Inventors: Christian Collette, Paris (FR); Franco Marciandi, Milan (IT); Jean-Michel Paul, Metz (FR)

(73) Assignee: Atofina, Puteaux (FR)

(*) Notice: Subject to any disclaimer, the term of this patent is extended or adjusted under 35 U.S.C. 154(b) by 0 days.

(21) Appl. No.: 10/240,050

(22) PCT Filed: Mar. 27, 2001

(86) PCT No.: PCT/FR01/00924

§ 371 (c)(1),
(2), (4) Date: Jan. 16, 2003

(87) PCT Pub. No.: WO01/74736

PCT Pub. Date: Oct. 11, 2001

(65) Prior Publication Data

US 2004/0077813 A1 Apr. 22, 2004

(30) Foreign Application Priority Data

Mar. 31, 2000 (FR) .......................... 00 04142

(51) Int. Cl.⁷ ............................................ C08F 120/06
(52) U.S. Cl. .................. 526/317.1; 526/319; 526/320; 524/831; 524/832; 560/98
(58) Field of Search ................ 524/831, 832, 524/767, 458, 460, 833.377; 526/317.1, 319, 320; 560/98

(56) References Cited

U.S. PATENT DOCUMENTS

| | | | |
|---|---|---|---|
| 4,037,035 A | 7/1977 | Blanc et al. ............ | 526/16 |
| 4,453,261 A * | 6/1984 | Waite et al. ............ | 524/458 |
| 4,562,226 A * | 12/1985 | Coombes et al. ....... | 524/767 |
| 5,059,632 A | 10/1991 | Horn et al. ............. | 521/137 |
| 5,349,036 A * | 9/1994 | Simpson et al. ........ | 526/320 |
| 5,814,144 A * | 9/1998 | Coutts et al. ........... | 106/499 |
| 5,840,114 A | 11/1998 | Jeknavorian et al. ... | 106/802 |

FOREIGN PATENT DOCUMENTS

| | | | |
|---|---|---|---|
| EP | 0 747 374 A1 | 12/1996 | ......... C07D/311/70 |
| EP | 0 753 488 A2 | 1/1997 | ......... C04B/24/26 |
| EP | 0 753 488 A3 | 4/1997 | ......... C04B/24/26 |
| EP | 0 976 769 * | 2/2000 | |
| EP | 0 976 769 A2 | 2/2000 | ......... C08F/220/00 |
| EP | 0 799 807 B1 | 7/2002 | ......... C04B/24/26 |
| FR | 2739850 | 4/1997 | ......... C07C/69/54 |
| JP | 4-285678 * | 10/1992 | |
| JP | 9-78050 * | 3/1997 | |
| WO | 98/28353 A2 | 7/1998 | ......... C08F/220/04 |
| WO | 98/28353 A3 | 7/1998 | ......... C08F/220/04 |

* cited by examiner

*Primary Examiner*—Tatyana Zalukaeva
(74) *Attorney, Agent, or Firm*—Whyte Hirschboeck Dudek SC

(57) ABSTRACT

The invention concerns a method for preparing water-soluble acrylic copolymers comprising the following steps: (i) preparing at least a monomer (1) of formula (I) wherein Ao is a $-(RtO)_m Rz$ or $-NRp(RtO)_m Rz$ group, by reacting a (meth)acrylic anhydride derivative (1') of formula (II) with a compound of formula AoH, Ao being as defined above; (ii) copolymerizing said monomer (1) with at least a monomer (2) of (meth)acrylic acid or of a derivative of said acid. The invention also concerns novel water-soluble acrylic copolymers and their use as superplasticizers or dispersants for hydraulic binders such as cements.

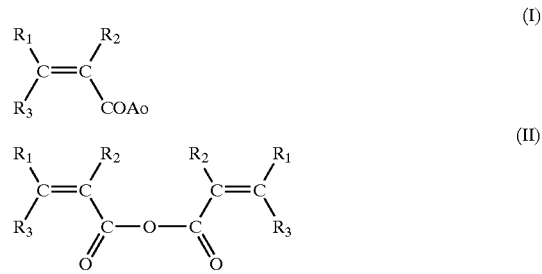

16 Claims, No Drawings

METHOD FOR PREPARING WATER-SOLUBLE ACRYLIC COPOLYMERS

The present invention relates to a process for the preparation of water-soluble acrylic copolymers and to water-soluble acrylic copolymers, and to their use as plasticizers or dispersants for hydraulic binders, such as cements.

The use of plasticizers or dispersants in suspensions or pastes of hydraulic inorganic binders is well known.

Much research is constantly being carried out to develop novel plasticizers or dispersants which make it possible to improve the rheological characteristics of cement compositions, for the purpose of avoiding recourse to the addition of water to compensate for the decline in rheological characteristics with time.

Thus, the European patent application published under the number 753 488 relates to a cement dispersant obtained by polymerization in the presence of a chain-transfer agent. To obtain the desired molecular mass distribution, use is made, as chain-transfer agent, of an alcohol or a carboxylic acid comprising a thiol group. However, cement suspensions comprising such a dispersant are unsatisfactory with regard to their rheological and mechanical properties.

The European patent application published under the number 799 807 relates to a process for dispersing a cement composition in which use is made of a polymer obtained by polymerization of a monomer component comprising a monomer of alkoxypoly(alkylene glycol)mono(meth)acrylic ester type produced by an inter-esterification reaction. The disadvantage of such a preparation is that it leads to the formation of by-products of the di(meth)acrylic functional ester type, which results in crosslinking during the polymerization and produces a crosslinked macromolecular polymer which is not very effective as cement dispersing agent.

The European patent application published under the number 976 769 provides acrylic copolymers comprising the following repeat units:

—[$CR_aR_c$—$CR_bCOO^-M^+$]— and —[$CR_iR_{iii}$—$CR_{ii}(CH_2)_nAo$]— in which $R_a$, $R_b$, $R_c$, $R_i$ and $R_{ii}$ are identical or different and represent a hydrogen atom or a methyl group; $M^+$ is a proton or a cation of an element from Group IA or IIA or an ammonium; n is an integer between 0 and 2; Ao is —COO—$(R_TO)_m$—$R_z$, where $R_T$ is a saturated $C_2$ to $C_4$ alkyl group, m is an integer between 7 and 50 and $R_z$ is a hydrogen atom or a $C_1$ to $C_4$ alkyl group; and $R_{iii}$ is a hydrogen atom or the COOH group, $COO^-M^+$ group in which $M^+$ is as defined above or Ao group as defined above;

these copolymers optionally comprising a third type of repeat unit in an amount of between 0 and 20% with respect to the total mass of the repeat units.

These copolymers, which comprise silanol groups in the end position, are obtained by copolymerization of the monomers in the presence of the following chain-transfer agents:

(A) SH—$R_o$—$Si(R_{IB})_{NB}(OR_{IA})_{NA}$, in which $R_{IA}$ is a hydrogen or a saturated $C_1$ to $C_3$ alkyl, $R_{IB}$ is a $C_1$ to $C_3$ alkyl, NB is an integer having the value 1 or 0, NA is an integer having the value 2 or 3, and $R_o$ is a linear or branched alkylene chain having from 1 to 20 carbon atoms;

or a mixture of (A) with inorganic phosphorous or phosphoric acids or their salts.

Such copolymers exhibit advantageous properties as regards the dispersion of cement. However, because the control of their molecular mass is obtained by means of the chain-transfer agent, during their use, their structure is frozen, it does not change with time and does not develop according to the alkaline nature of the medium.

A subject matter of European patent application No. 747 374 is a hydrophilic contact lens formed by copolymerization of a polymerizable mixture comprising at least one hydrophilic monomer and additionally comprising at least one crosslinking agent; mention is made, as example of such a crosslinking agent, of polyethylene glycol having, at its two terminal ends, acrylate or methacrylate groups.

A subject matter of the invention is therefore the preparation of water-soluble acrylic copolymers not exhibiting the disadvantages which have just been mentioned.

A first subject matter of the invention is therefore a process for the preparation of a water-soluble acrylic copolymer comprising the following stages:

(i) preparation of at least one monomer (1) of formula $$R_1\phantom{xxx}R_2$$
$$\phantom{xx}\diagdown\phantom{xx}\diagup$$
$$\phantom{xxxx}C=C$$
$$\phantom{xx}\diagup\phantom{xx}\diagdown$$
$$R_3\phantom{xxx}COAo$$

in which $R_1$, $R_2$ and $R_3$ are identical to or different from one another and can be a hydrogen atom or a methyl group;

Ao is an —$O(RtO)_mRz$ or —$NRp(RtO)_mRz$ group, Rt being a saturated alkylene group having from 1 to 4 carbon atoms, Rz being a saturated alkyl group having from 1 to 6 carbon atoms and Rp being a hydrogen atom or a saturated alkyl group having from 1 to 8 carbon atoms;

by reaction of a (meth)acrylic anhydride derivative (1') of formula $$R_1\phantom{xx}R_2\phantom{xxxxx}R_2\phantom{xx}R_1$$
$$\phantom{x}\diagdown\phantom{x}\diagup\phantom{xxxxxx}\diagdown\phantom{x}\diagup$$
$$\phantom{xxx}C=C\phantom{xxxxxx}C=C$$
$$\phantom{x}\diagup\phantom{xx}\diagdown\phantom{xxxx}\diagup\phantom{xx}\diagdown$$
$$R_3\phantom{xxx}C-O-C\phantom{xxx}R_3$$
$$\phantom{xxxx}\parallel\phantom{xxxxx}\parallel$$
$$\phantom{xxxx}O\phantom{xxxxx}O$$

in which $R_1$, $R_2$ and $R_3$ are as defined above, with a compound of formula AoH, Ao being as defined above, (ii) copolymerization of said monomer (1) with at least one monomer (2) of (meth)acrylic acid or of a derivative of this acid.

A second subject matter of the invention relates to a water-soluble acrylic copolymer capable of being obtained by a process comprising the following stages:

(i) reaction of:

a compound of formula AoH, in which:

Ao is an —$O(RtO)_mRz$ or —$NRp(RtO)_mRz$ group, Rt being a saturated alkylene group having from 1 to 4 carbon atoms, m being an integer between 3 and 150, Rz being a saturated alkyl group having from 1 to 6 carbon atoms and Rp being a hydrogen atom or a saturated alkyl group having from 1 to 8 carbon atoms; with an excess of a (meth)acrylic anhydride derivative (1') of formula

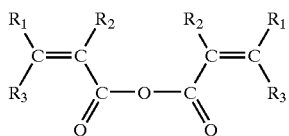

in which $R_1$, $R_2$ and $R_3$ are identical to or different from one another and can be a hydrogen atom or a methyl group;

(ii) optionally, partial or complete neutralization, by neutral or basic hydrolysis, of the excess of the unreacted derivative (1');

(iii) copolymerization of the product obtained in stage (ii) with at least one monomer (2) of (meth)acrylic acid or of a derivative of this acid;

provided that, if complete neutralization in stage (ii) is chosen, then a derivative (1)' is chosen such that its neutralized form is different from the monomer (2).

A third subject matter of the invention relates to the use of a copolymer according to the invention or obtained by the process according to the invention as plasticizer or dispersant in a hydraulic binder.

A fourth subject matter of the invention is a hydraulic binder composition comprising at least one copolymer according to the invention or obtained by the process according to the invention.

A fifth subject matter of the invention is an aqueous solution comprising at least one copolymer according to the invention or obtained by the process according to the invention.

Thus, the invention introduces the following advantages:

it makes available acrylic copolymers which are not very crosslinked or are entirely uncrosslinked, which makes it possible to avoid the gelling phenomena which render them unsuitable for numerous applications;

it makes it possible to prepare acrylic copolymers with highly varied structures, because of the highly variable lengths of the polyoxyalkylated chains and monomer ratios which can be used, it makes it possible to prepare aqueous solutions comprising a high concentration of acrylic copolymer;

it makes it possible to cheaply obtain copolymers with improved properties with respect to those of the comparable compounds of the state of the art;

it thus makes it possible to reduce the cost of the hydraulic binder compositions and to improve the mechanical properties of these compositions after curing.

Other characteristics and advantages of the invention will now be described in detail in the account which follows.

Preparation of the Monomer (1)

(Meth)acrylic Anhydride Derivative (1')

The (meth)acrylic anhydride derivative (1') is preferably acrylic anhydride or methacrylic anhydride, which are prepared, for example, by reaction of (meth)acrylic acid with acetic anhydride in the presence of a polymerization inhibitor.

This reaction is disclosed in particular in the French patent application published under the number 2 592 040, Of course, the procedure disclosed in this document can be adapted by a person skilled in the art so that it makes possible the preparation of the derivative (1') in which one and/or the other of the $R_1$ and $R_3$ groups is a (are) methyl group(s).

Compound AoH

According to the invention, the compound AoH can be either a compound of formula $HO(RtO)_m Rz$ or a compound of formula $HNRp(RtO)_m Rz$.

Mention may be made, as examples of compounds of formula $HO(RtO)_m Rz$, of:

methoxy(polyethylene glycol), methoxy(polypropylene glycol), methoxy(polyethylene glycol)(polypropylene glycol), methoxy(polyethylene glycol)(polybutylene glycol), methoxy(polypropylene glycol)(polybutylene glycol), methoxy(polyethylene glycol)(polypropylene glycol)(polybutylene glycol), ethoxy(polyethylene glycol), ethoxy(polypropylene glycol), ethoxy(polyethylene glycol)(polypropylene glycol), ethoxy(polyethylene glycol)(polybutylene glycol), ethoxy(polypropylene glycol)(polybutylene glycol), ethoxy(polyethylene glycol)(polypropylene glycol)(polybutylene glycol), butoxy(polyethylene glycol), butoxy(polypropylene glycol), butoxy(polyethylene glycol)(polypropylene glycol), butoxy(polyethylene glycol)(polybutylene glycol), butoxy(polypropylene glycol)(polybutylene glycol) and butoxy(polyethylene glycol)(polypropylene glycol)(polybutylene glycol).

Mention may be made, as examples of compounds of formula $HNRp(RtO)_m Rz$, of:

methoxy(polyethylene glycol)amine, methoxy(polypropylene glycol)amine, methoxy(polyethylene glycol)(polypropylene glycol)amine, methoxy(polyethylene glycol)(polybutylene glycol)amine, methoxy(polypropylene glycol)(polybutylene glycol)amine, methoxy(polyethylene glycol)(polypropylene glycol)-(polybutylene glycol)amine, methoxy(polyethylene glycol)methylamine, methoxy(polypropylene glycol)methylamine, methoxy(polyethylene glycol)(polypropylene glycol)methylamine, methoxy(polyethylene glycol)(polybutylene glycol)methylamine, methoxy(polypropylene glycol)(polybutylene glycol)methylamine, methoxy(polyethylene glycol)(polypropylene glycol)(polybutylene glycol)methylamine, methoxy(polyethylene glycol)ethylamine, methoxy(polypropylene glycol)ethylamine, methoxy(polyethylene glycol)(polypropylene glycol)-ethylamine, methoxy(polyethylene glycol)(polybutylene glycol)ethylamine, methoxy(polypropylene glycol)(polybutylene glycol)ethylamine, methoxy(polyethylene glycol)(polypropylene glycol)(polybutylene glycol)-ethylamine, ethoxy(polyethylene glycol)amine, ethoxy(polypropylene glycol)amine, ethoxy(polyethylene glycol)(polypropylene glycol)amine, ethoxy(polyethylene glycol)(polybutylene glycol)amine, ethoxy(polypropylene glycol)(polybutylene glycol)amine, ethoxy(polyethylene glycol)(polypropylene glycol)(polybutylene glycol)-amine, ethoxy(polyethylene glycol)methylamine, ethoxy(polypropylene glycol)methylamine, ethoxy(polyethylene glycol)(polypropylene glycol)methylamine, ethoxy(polyethylene glycol)(polybutylene glycol)methylamine, ethoxy(polypropylene glycol)(polybutylene glycol)methylamine, ethoxy(polyethylene glycol)(polypropylene glycol)(polybutylene glycol)methylamine, ethoxy(polyethylene glycol)ethylamine, ethoxy(polypropylene glycol)ethylamine, ethoxy(polyethylene glycol)(polypropylene glycol)ethylamine, ethoxy(polyethylene glycol)(polybutylene glycol)ethylamine, ethoxy(polypropylene glycol)-(polybutylene glycol)ethylamine, ethoxy(polyethylene glycol)(polypropylene glycol)(polybutylene glycol)-ethylamine, butoxy(polyethylene glycol)amine, butoxy(polypropylene glycol)amine, butoxy(polyethylene glycol)(polypropylene glycol)amine, butoxy(polyethylene glycol)(polybutylene glycol)amine, butoxy(polypropylene glycol)(polybutylene glycol)amine, butoxy(polyethylene glycol)(polypropylene glycol)(polybutylene glycol)amine, butoxy (polyethylene glycol) methylamine, butoxy(polypropylene glycol)methylamine, butoxy(polyethylene glycol)(polypropylene glycol)methylamine, butoxy(polyethylene glycol)(polybutylene glycol)methylamine, butoxy(polypropylene glycol)(polybutylene glycol)methylamine, butoxy(polyethylene glycol)(polypropylene glycol)(polybutylene glycol)methylamine, butoxy(polyethylene glycol)ethylamine, butoxy(polypropylene glycol)ethylamine, butoxy(polyethylene glycol)(polypropylene glycol)ethylamine, butoxy(polyethylene glycol)(polybutylene glycol)ethylamine, butoxy(polypropylene glycol)(polybutylene glycol)-ethylamine and butoxy(polyethylene glycol)-(polypropylene glycol)(polybutylene glycol)ethylamine.

m is an integer which is generally between 3 and 150.

Use is preferably made of the compounds AoH in which m is greater than 10 and in particular greater than 20.

Of course, use may be made of a single AoH derivative or of a mixture of AoH derivatives.

Reaction of the Derivative (1') with the Compound AoH

The French patent application published under the number 2 739 850 gives an example of the preparation of a monomer (1) in which Ao is an —O(RtO)$_m$Rz group, namely by reaction of a (meth)acrylic anhydride with an alcohol of formula R$^4$[OC$_2$H$_3$(R$^5$)]$_n$OH, R$^4$ being a hydrophobic radical and R$^5$ a hydrogen atom or a methyl group.

More generally, the reaction of the derivative (1') with the compound AoH, whether the latter is an —O(RtO)$_m$Rz or —NRp(RtO)$_m$Rz group, is usually carried out at a temperature of between 20 and 120° C., preferably between 30 and 100° C. The duration of the reaction depends on the experimental conditions, such as the temperature and the amounts of catalyst used, but it is usually between 1 and 20 hours. The reactants are used in a molar ratio of the (meth)acrylic anhydride derivative (1') to the compound AoH of between 0.6 and 3, preferably between 1.1 and 3. It is preferable to use at least one polymerization inhibitor, such as hydroquinone or one of its derivatives (for example MeHQ), phenol derivatives, such as BHT (2,6-di(tert-butyl)hydroxytoluene), or phenothiazine. The content of inhibitor(s) is generally between 100 and 5,000 ppm. These inhibitors are generally used in the presence of a stream of air into the reactor.

The reaction is preferably carried out by introducing the reactants into the reactor at a temperature appropriate for the initiation of the reaction in the liquid phase. Stirring of the mixture is then continued at the reaction temperature for the time necessary to bring the esterification or the amidation to completion.

On completion of the reaction, the mixture of monomers obtained is composed of an alkoxy(polyalkylene glycol)(meth)acrylic ester monomer and/or of an alkoxy(polyalkylene glycol)(meth)acrylamide monomer.

According to a first method of preparation of the monomer (1), the excess of the derivative (1') remaining after the reaction between the derivative (1') and the compound of formula AoH is completely neutralized by neutral or basic hydrolysis before the copolymerization of stage (ii).

The neutralization is then generally carried out by addition of water or of alkaline solution to the reaction mixture at a temperature of between 50 and 80° C. for 5 to 8 hours.

According to a second method of preparation of the monomer (1), the excess of derivative (1') remaining after the reaction between this derivative and the compound of formula AoH is left during the copolymerization stage (ii) or is neutralized, but only in part, before this stage.

It is desirable for the level of unreacted derivative (1') to remain less than or equal to 20% with respect to the starting amount of derivative (1') introduced. Neutralization is therefore preferable when the level of unreacted derivative (1') is greater than 20%.

The inventors have discovered that, surprisingly, the presence of an excess of (meth)acrylic anhydride derivative (1') advantageously results in the production of superplasticizers having good rheological and processing properties because of their ability to gradually release linear active chains.

A probable explanation of this phenomenon is that complex copolymer networks are formed when the derivative (1') has not been neutralized or has been partially neutralized before the copolymerization stage. These networks are subsequently destroyed by the basicity of the hydraulic binder, which results in the generation of new linear chains which interact with the cement particles and thus modify their electrostatic and steric properties. The rate of generation of the linear chains produces an effect equivalent to the constant addition of linear polymers to the hydraulic binder. The more complex the network, the greater the "reservoir" of linear chains. The ratio of the free linear chains to the trapped linear chains can be adjusted by an appropriate choice of the amount of derivative (1'). It is possible in this way to obtain the desired activity of the copolymer. It is also possible to blend copolymers obtained with the neutralized derivative (1') with copolymers obtained with the unneutralized or only slightly neutralized derivative (1').

This possibility of preparing a "made to measure" copolymer is a major innovation with respect to the techniques of the prior art.

The partial neutralization is carried out as for the first embodiment, that is to say that water or an alkaline solution is added as indicated for the first method of preparation. By adjusting the amount of water added, it is possible to obtain an aqueous solution comprising a mixture of monomers, the concentrations of which and the concentration of hydrolyzed derivative (1') correspond to the concentrations desired for the following copolymerization stage.

This preparation of monomers (1), whether they are in the ester form or in the amide form, thus makes it possible to prepare a mixture of monomers which, first, is appropriate for the copolymerization stage and which, secondly and in contrast to the techniques of the prior art, does not require any distillation operation. This therefore constitutes a marked improvement with respect to the prior art.

Monomer (2)

The monomer (2) can correspond to the formula:

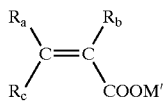

in which $R_a$, $R_b$ and $R_c$ are identical to or different from one another and can be a hydrogen atom or a methyl group;

M' is a hydrogen atom, a metal from Group IA or IIA, an ammonium or an organic amine group.

Mention may be made, as examples of monomers (2), of acrylic acid, methacrylic acid, their salts with alkali metals or alkaline earth metals, their ammonium salts and their organic amine salts. Mixtures of these compounds may be used.

Preferably, acrylic acid or methacrylic acid is used as monomer (2).

Copolymerization

The copolymerization is generally carried out with a ratio by weight of the monomer (1) to the monomer (2) of between 5:95 and 98:2, preferably between 50:50 and 98:2.

The copolymerization of stage (ii) can be carried out in the presence of at least one other monomer (3) which is a monomer copolymerizable with the monomers (1) and (2).

The proportion by mass of this monomer (3) is generally between 0 and 20% with respect to the total mass of the monomers (1), (2) and (3).

Use may be made, as monomers (3), of the monomers mentioned on page 5, lines 49 to 58, of the abovementioned European patent application No. 753 488, those mentioned on page 7, lines 12 to 26, of the abovementioned European patent application No. 7990807 or those mentioned on page 10, line 37, to page 12, line 3, of the international patent application published under the number WO 98/28353.

Use is preferably made of one or more monomers (3) chosen from:

(meth)acrylic anhydride, (meth)acrylic esters of $C_1$ to $C_{20}$ aliphatic alcohols, maleic acid or its anhydride and their derivatives (salts, hemiesters or esters of alcohols with a long polyoxyalkylated chain, alkoxyalcohols, amides or semiamides with a long polyoxyalkylated amine chain), polyethoxy monoallyl ethers of formula $CH_2=CHCH_2O(C_2H_4O)_p-R$, in which p is between 5 and 100 and R is a $C_1$ to $C_4$ alkyl, monounsaturated $C_3$ to $C_5$ sulfonic acids, and compounds of formula $CH_2=CR_X-CO-A-CR_{X1}-CH_2R_{X2}-SO_3M'$, in which M' is as defined for the monomer (2), $R_X$ is a hydrogen atom or a methyl, $R_{X1}$ and $R_{X2}$ are, independently of one another, a hydrogen atom or a $C_1$ to $C_8$ alkyl, and A is NH or N—$CH_3$.

The copolymerization of the monomers (1), (2) and, if appropriate, (3) is generally carried out in water, although short-chain alcohols, such as methanol, ethanol or isopropyl alcohol, or other solvents, such as methyl ethyl ketone, may also be suitable.

The process may be continuous, semicontinuous or batchwise. It is also possible to carry out the copolymerization in the same reactor as that where the monomer (1) was prepared. In this way, changing of the reactor is avoided, which constitutes an additional advantage of the invention. In this case, it may be desirable to adjust the mixture of monomers in order for the molar ratios of the monomers to be those which are desired.

For the purpose of initiating the copolymerization reaction, it is preferable to add an appropriate free-radical reaction initiator to the mixture of monomers, in the bulk form or in solution in water or in a solvent. If the copolymerization is carried out in water or in an alcohol medium, use is preferably made of water-soluble copolymerization initiators, such as ammonium, sodium or potassium persulfate, or hydrogen peroxide, with or without an activator, such as $FeSO_4.7H_2O$ or sodium metabisulfite, and purging the reactor with nitrogen.

In the case of the use of polar solvents not comprising hydroxyl groups, it is convenient to use initiators which are soluble in the same medium, such as a hydroperoxide, ketone peroxides or percarbonates.

For the purpose of controlling the molecular mass of the polymers obtained, use may be made of a chain-transfer agent.

Use may be made, as chain-transfer agent, of derivatives of thiol type.

Mention may be made, as derivatives of thiol type, of those mentioned on page 5, lines 41 to 48, of the abovementioned European patent application No. 799 807, in particular mercaptoethanol, thioglycerol, thioglycolic acid, 2-mercaptopropionic acid, 3-mercaptopropionic acid, thiomalic acid, octyl thioglycolate, octyl 3-mercaptopropionate or 2-mercaptoethanesulfonic acid. Of course, these agents can be used alone or as a mixture.

Use is preferably made of the chain-transfer agents of thiol type disclosed in the abovementioned European patent application No. 976 769, which are functionalizing chain-transfer agents of formula HS—Ro-Si—$(OR_{1a})$ in which $R_{1a}$ is H or a saturated $C_1$ to $C_3$ alkyl group and Ro is a linear or branched alkyl chain. These agents are used as such or as a mixture with $H_3PO_2$, $H_3PO_3$ or their salts. They are preferred because they introduce end polar groups (silanols) which improve the ability of the copolymer to become firmly attached to the inorganic particles.

Mercaptopropyltrimethoxysilane is a particularly advantageous chain-transfer agent.

The reaction temperature can vary according to the type of solvent used. In the case of an aqueous-phase copolymerization, the temperatures are generally within the range from 50 to 120° C., preferably from 60 to 100° C. The reaction duration is generally between 1 and 8 hours, preferably between 2 and 5 hours. The content of dry matter in the aqueous polymer solution can vary between 20 and 70% by weight; it is preferably between 30 and 60%.

A small amount of water can be run into the reactor before the addition of the reactants. The reactants can be introduced simultaneously at a constant flow rate with stirring.

The initiator can be added separately.

As indicated above, the optional neutralization stage can also be take place at the end of the copolymerization reaction, during the cooling.

As mentioned above, the reaction can be carried out batchwise, preferably in the reactor which has been used for the preparation of the monomer (1), by mixing the monomers already present in the reactor with the other monomer or monomers, if desired, before the beginning of the copolymerization.

According to an alternative form, the copolymer is partially or completely neutralized during its formation by simultaneous (but separate) introduction of an alkaline solution during the introduction of the mixture of monomers into the reactor.

The amount of alkaline solution introduced is preferably calculated in order for the neutralization to be only partial and more preferably such that the amount of copolymer neutralized is between 40 to 70%.

According to another alternative form, the acrylic copolymer is partially or completely neutralized after the copolymerization stage. The copolymer is then preferably neutralized so that its pH is between 4 and 9.

Use

When the polymers according to the invention are added to an aqueous cement suspension, they improve both the mixing and the dispersion of the mass of cement and its rheological properties while being better plasticizers than the plasticizers of the prior art.

According to their structure, it is possible to improve one or more of their effects, which are, in particular, the prolongation of the rheology, the reduction in water, the curing or the setting delay, and the self-leveling nature of the cement suspension. These effects are also observed during use with other hydraulic binders, such as clays for the ceramic industry, mortars and plasters.

The aqueous mixtures in the form of suspensions or pastes comprising the cement and copolymers according to the invention comprise an amount of copolymer generally of between 0.03 and 2%, preferably between 0.05 and 1%, by weight of copolymer with respect to the dry cement.

The addition of the copolymers according to the invention to the cement suspensions or pastes is carried out by introduction of the copolymers as such or in the form of an aqueous solution comprising, by weight, more than 25% and preferably more than 30% of copolymer. Mixing is subsequently carried out until the mass becomes homogeneous.

When the polymer solution is added to a cement suspension or a cement-based paste, the volume of water is preferably reduced by the amount of water present in the polymer solution, so as to maintain the desired water/cement ratio.

Another advantage provided by the invention is that, as aqueous solutions which can comprise more than 50% of polymer can be produced reproducibly and routinely, these solutions can be sprayed using conventional equipment and according to conventional and inexpensive processes.

Additives

In addition to the plasticizers according to the invention, the cement composition can comprise conventional additives, such as air-entraining agents, antifoams, thickening agents, wetting agents, expanders, set retarders or accelerators, or shrinkage reducers. It is also possible to introduce conventional cement dispersants, such as dispersants based on polycondensates of sulfonated melamine or of sulfonated naphthalene and of formaldehyde, or else lignin derivatives.

EXAMPLES

The following examples are given solely by way of illustration: they have no limiting nature.

Measurement Methods Used a) Slump Test with an Abrams Cone According to NF 18-451

A concrete with the following composition is used:

| | |
|---|---|
| Gravel 10/20 R GEM | 830 kg |
| Gravel 4/10 R GEM | 308 kg |
| Sand 0/4 R GEM | 750 kg |
| CPA-CEMI 42.5 R Altkirch | 300 kg |

The concrete is mixed for 30 seconds before each of the tests and then it is reintroduced into the remainder of the cement suspension. The trapped air measurement is carried out on the fresh concrete at 10 minutes according to NFP 18-353.

The test specimens for the determination of the mechanical properties are 15×15×15 cm cubes prepared at the time t=0 in a suspension different from that which is used for the rheological measurements. Monitoring of the compressive strength is carried out at 24 h, 7 days and 28 days according to Standard NFP 18-406.

b) Determination of the Absolute Viscosity

The viscosity is determined at 30 revolutions per minute (No. 2 spindle) on a Brookfield LVT2 viscometer at a temperature of 25° C. or with a Rheology International viscometer, model R1:2: M, spindle 2.

c) Determination of the Molecular Mass by Liquid Chromatography

The polymer is dissolved, at a concentration of 1% (weight/volume) (40 mg/4 ml), in an aqueous $NH_4OH$ solution containing $NaN_3$ at a concentration of 0.02%. The liquid chromatography apparatus is composed of a Constometric® 3200 pump, a Rheodine® 7125 valve, a Differential Refractometer R 401® detector, a PW 2000-4000 TSK® gel column connected in series and thermostatically controlled at 40° C., and a Spectra Physics® integrator.

The columns are calibrated with polyethylene glycols of variable molecular mass and 200 $\mu l$ of sample solution are injected using 1% (weight/volume) dioxane in water as reference. The molecular mass of the polymer is determined according to the maximum of the elution peak.

d) Minislump Test

An Erweka AR 400 mixer is used to prepare the following composition:

| | |
|---|---|
| Portland cement, CPA-CEMI 42.5 | 625 g |
| Sand, standardized, EN-196-1 | 1 350 g |
| Silica, Milisil ® SA 4 (Silbeco Italiana) | 50 g |
| Water (water/cement ratio 0.42) | 261 g |
| Amount (in grams) of 35% weight/weight polymer solution (weight of polymer/weight of cement ratio of 0.175%) | 3.2 g |

If the concentration of polymer is different from 35%, the amount of solution added to the cement is consequently adjusted in order for the polymer/cement ratio to meet the condition given (0.175%). The differences in water content are compensated for by adjusting the total amount of water in order to observe the required water/cement ratio.

First, the polymer solution is diluted with a certain amount (5–10 ml) of the total amount of water used. The water is poured into the vessel (251–256 ml) and, with mechanical stirring (20 revolutions/minute) and in this order, the cement with the silica, then, portionwise, the sand and, at the end, the polymer solution of the present invention are added.

Stirring is continued for 1 minute at the same speed and for an additional minute at 30 revolutions/minute. Stirring is subsequently halted while pouring the homogeneous mass into a brass circular truncated cone with open ends, with a height of 40 mm, a diameter of the upper surface of 70 mm and a diameter of the surface of the base of 80 mm, placed on a PVC sheet. This container must be filled from the base to the brim. The excess suspension is removed using a strip. Two measurements are carried out:

1) the truncated cone is filled and, after one minute, the contents are poured onto the sheet by lifting up the truncated cone;
2) the truncated cone is filled a second time with the same suspension, after having allowed the latter to stand for variable times (2, 4 and 6 hours) and having remixed it manually before the test, and the operation of part 1) is repeated. Thirty seconds after lifting up the truncated cone, the diameter of the paste obtained is measured in centimeters.

Example 1

Preparation of an alkoxy(polyalkylene glycol) methacrylic ester

The apparatus consists of a 2 liter glass reactor equipped with a heating jacket connected to a thermostatically-controlled bath, equipped with a thermocouple, with a stirrer, with a feed pump, with a dropping funnel and with a condenser.

The following are introduced with stirring into the reactor, which has been preheated to 80° C.: 500 g (0.5 mol) of molten MPEG 1000 (methoxy(polyethylene glycol) with an average molecular mass of 1 000 g/mol); 88.5 g (0.57 mol) of methacrylic anhydride; 0.6 g of BHT (3,5-di(tert-butyl)-4-hydroxytoluene) stabilizer; and 5 g of triethylamine as catalyst.

The reaction is carried out at 80° C. for 6 hours; subsequently, 175 g of water are added and the hydrolysis of the anhydride is brought to completion by stirring the reaction mixture at 80° C. for 5 hours. The 70% solution is further diluted with 280 g of water to a final content of ester of approximately 50%.

Example 2

Preparation of an alkoxy(polyalkylene glycol) methacrylic ester

The following are introduced with stirring into the same reactor as in example 1, which has been heated beforehand to 80° C.: 500 g (0.25 mol) of molten MPEG 2000 (methoxy (polyethylene glycol) with an average molecular mass of 2 000); 44.3 g (0.29 mol) of methacrylic anhydride; 0.6 g of BHT (3,5-di(tert-butyl)-4-hydroxytoluene) as stabilizer; and 5 g of triethylamine as catalyst.

The reaction is carried out at 80° C. for 7 hours, then 254 g of water are added and the hydrolysis of the anhydride is brought to completion by stirring the reaction mixture at 80° C. for 5 hours. After cooling, an additional 245 g of water are added to achieve a concentration of the ester in water of approximately 50%.

Example 3

Preparation of an alkoxy(polyalkylene glycol) methacrylamide

The following are added with stirring to the same reactor as in example 1, which has been heated beforehand to 80° C.: 500 g (0.5 mol) of molten Jeffamine® M 1000 (methoxy (polyethylene glycol)(polypropylene glycol)monoamine with an average molecular mass of 1 000 g/mol); 88.5 g (0.57 mol) of methacrylic anhydride; and 0.6 g of BHT (3,5-di(tert-butyl)-4-hydroxytoluene) stabilizer.

The reaction is carried out at 80° C. for 4 hours, then 400 g of water are added and the reaction is continued at 80° C. for an additional 3 hours. The final mixture, comprising approximately 50% of amide, is cooled and is used in the following copolymerization operation.

Example 4

Preparation of the alkoxy(polyalkylene glycol) methacrylamide

The following are introduced with stirring into the same reactor as in example 1, which has been heated beforehand to 80° C.: 400 g (0.19 mol) of molten Jeffamine® M 2070 (methoxy(polyethylene glycol)(polypropylene glycol) monoamine with an average molecular mass of 2 070); 34.2 g (0.22 mol) of methacrylic anhydride; and 0.5 g of BHT (3,5-di(tert-butyl)-4-hydroxytoluene) stabilizer.

The reaction is carried out at 80° C. for 4 hours, then 385 g of water are added and the reaction is continued at 80° C. for an additional 3 hours.

The final mixture, with an amide content of approximately 50%, is cooled and used in the following copolymerization operation.

Example 5

Preparation of an alkoxy(polyalkylene glycol) methacrylic ester Comprising Unhydrolyzed Methacrylic Anhydride The following are introduced with stirring into the reactor of example 1, which has been preheated to 80° C.: 500 g (0.5 mol) of molten MPEG 1000 methoxy(polyethylene glycol) with an average molecular mass of 1 000 g/mol); 108 g (0.7 mol) of methacrylic anhydride; 0.6 g of BHT, 3,5-di(tert-butyl)-4-hydroxytoluene) stabilizer; and 5 g of triethylamine as catalyst.

The reaction is carried out at 80° C. for 6 hours; after cooling, 460 g of water are added in order to have a final content of ester of approximately 50%; the solution thus obtained is used immediately in the following copolymerization stage.

Example 6

Preparation of an alkoxy(polyalkylene glycol) methacrylic ester Comprising Unhydrolyzed Methacrylic Anhydride The following are introduced with stirring into the reactor of example 1, which has been preheated to 80° C.: 500 g (0.25 mol) of molten MPEG 2000 (methoxy(polyethylene glycol) with an average molecular mass of 2 000 g/mol); 62 g (0.4 mol) of methacrylic anhydride; 0.6 g of BHT (3,5-di(tert-butyl)-4hydroxytoluene) stabilizer; and 5 g of triethylamine as catalyst.

The reaction is carried out at 80° C. for 6 hours; after cooling, 470 g of water are added in order to have a final content of ester of approximately 50%; the solution thus obtained is used immediately in the following copolymerization stage.

Example 7

Preparation of the Dispersant According to the Invention (Copolymerization)

277 g of demineralized water are introduced with stirring into a 1 liter glass reactor equipped with a thermocouple, with a stirrer, with a dropping funnel, with three feed pumps, with a nitrogen inlet pipe and with a reflux condenser, the trapped air being displaced by flushing with nitrogen, and heating is carried out to 80–85° C. When this temperature is reached, the following are added over three hours using a pump:

- an aqueous mixture formed of 400 g of an aqueous solution prepared according to Example 1, 29.3 g of methacrylic acid; and 4.4 g of Dynasylan® MTMO (3-mercaptopropyltrimethoxysilane) as functionalizing agent; and
- 16 g of an aqueous solution (10% weight/weight) of ammonium persulfate $(NH_4)_2S_2O_8$.

After 3 hours, the reaction is brought to completion by the addition, all at once, of 4 g of a 10% weight/weight ammonium persulfate solution and while maintaining the temperature at approximately 80° C. for approximately 1 hour.

After cooling, the polymer solution has a content of dry matter of 35.7% (viscosity 0.15 Pa.s at 100 revolutions minute) and is virtually completely neutralized with a 30% aqueous sodium hydroxide solution (final content of dry matter 34%).

The cement dispersant of the present invention has a weight-average molecular mass of 22 000 and a maximum value of 14 000.

The minislump test as defined above is subsequently carried out with the polymer solution. The results are recorded below in table 1.

Example 8

Preparation of the Dispersant According to the Invention (Copolymerization)

The dispersant is prepared in a similar way to what is indicated for example 7 but while employing 273 g of demineralized water and:

- an aqueous mixture formed by 500 g of aqueous solution prepared according to Example 2, 16.8 g of methacrylic acid; and 2.5 g of Dynasylan® MTMO (3-mercaptopropyltrimethoxysilane) as functionalizing agent; and
- 16 g of an aqueous solution (10% weight/weight) of ammonium persulfate $(NH_4)_2S_2O_8$.

After 3 hours, the reaction is brought to completion by adding, all at once, 4 g of a 10% weight/weight ammonium persulfate solution and while maintaining the temperature at 80–85° C. for approximately 1 hour.

After cooling, the polymer solution has a content of dry matter of 35.7% and is virtually completely neutralized using a 30% aqueous sodium hydroxide solution (content of dry matter 35%).

The cement dispersant of the present invention has a weight-average molecular mass of 25 000 and a maximum value of 14 000.

The minislump test as defined above is subsequently carried out with the polymer solution. The results are recorded below in table 1.

Example 9

Preparation of Cement Dispersant by Way of Comparison

A cement dispersant is prepared in a similar way to what is indicated for example 7 but while employing a commercially available monomer prepared by trans-esterification (Bisomer S 20 W from Inspec Ltd, which is a 50% aqueous solution of methoxy(polyethylene glycol)methacrylate with an average molecular mass of 2 080) and,

- an aqueous mixture formed by 500 g of Bisomer 20 W, 28.9 g of methacrylic acid, and 2.5 g of Dynasylan® MTMO (3-mercaptopropyltrimethoxysilane) as functionalizing agent; and
- 16 g of aqueous ammonium persulfate $(NH_4)_2S_2O_8$ solution (10% weight/weight).

After less than 2 hours, the reaction is halted because of complete formation of a water-insoluble, gelled and crosslinked product.

The minislump test as defined above is subsequently carried out with the polymer solution. The results demonstrate the complete absence of plasticizing properties of this product.

The experiment was repeated with samples of different production batches from Inspec Ltd. The same negative results were obtained.

Example 10

Preparation of the Dispersant According to the Invention (Copolymerization)

The dispersant is prepared in a similar way to what is indicated for example 7 but while employing the monomer mixture of example 3.

The reactor is charged with 390 g of demineralized water and then, after heating to 80–85° C., the following are added:

- an aqueous mixture composed of 500 g of aqueous solution prepared according to Example 3; 32.7 g of methacrylic acid; and 5.1 g of Dynasylan® MTMO (3-mercaptopropyltrimethoxysilane) as functionalizing agent; and
- 33.3 g of an aqueous solution (10% weight/weight) of ammonium persulfate $(NH_4)_2S_2O_8$.

After 3 hours, the reaction is brought to completion by adding, all at once, 8.3 g of a 10% weight/weight ammonium persulfate solution and while maintaining the temperature at 80–85° C. for approximately 1 hour.

After cooling the polymer solution, the content of dry matter is 35.2% and the polymer solution is subsequently virtually completely neutralized using a 30% aqueous sodium hydroxide solution (final content of dry matter 34.2%).

The cement dispersant of the present invention has a weight-average molecular mass of 22 000 with a maximum value of 11 000.

The minislump test as defined above is subsequently carried out with the polymer solution. The results are recorded below in table 1.

Example 11

Preparation of the Dispersant According to the Invention (Copolymerization)

The dispersant is prepared in a similar way to what is indicated for example 7 but while employing the monomer mixture of example 5.

277 g of demineralized water are introduced into the reactor and then, after heating to 80° C., the following are added:

- a mixture formed of 400 g of aqueous solution prepared according to example 5, 17.5 g of methacrylic acid; and 4.4 g of Dynasylan® MTMO (3-mercaptopropyltrimethoxysilane) as functionalizing agent; and
- 16 g of an aqueous solution (10% weight/weight) of ammonium persulfate $(NH_4)_2S_2O_8$.

After 3 hours, the reaction is brought to completion by adding, all at once, 4 g of a 10% (weight/weight) ammonium persulfate solution and while maintaining the temperature at 80° C. for approximately 1 hour.

After cooling, the polymer solution has a content of dry matter of 35.7% and is subsequently virtually completely neutralized using a 30% aqueous sodium hydroxide solution (final content of dry matter 34.4%).

The cement dispersant thus obtained has a weight-average molecular mass of 30 000 and a maximum value of 17 000.

Example 12

Preparation of the Dispersant According to the Invention (Copolymerization)

The dispersion is prepared in a similar way to what is indicated for example 7 but while employing the monomer mixture of example 6.

298 g of demineralized water are introduced into the reactor and then, after heating to 80° C., the following are added:

- a mixture formed by 500 g of aqueous solution prepared according to example 6, 18.6 g of methacrylic acid; and 2.5 g of Dynasylan® MTMO (3-mercaptopropyltrimethoxysilane) as functionalizing agent; and
- 16 g of an aqueous solution (10% weight/weight) of ammonium persulfate $(NH_4)_2S_2O_8$.

After 3 hours, the reaction is terminated by adding, all at once, 4.5 g of a 10% (weight/weight) ammonium persulfate solution and while maintaining the temperature at 80° C. for approximately 1 hour. After cooling, the polymer solution has a content of dry matter of 34.4% and is virtually completely neutralized with a 30% aqueous sodium hydroxide solution (final content of dry matter 33.0%).

The cement dispersant of the present invention has a weight molecular mass of 48 000 and a maximum value of 25 000.

The minislump test as defined above is subsequently carried out with the polymer solution. The results are recorded below in table 1.

Example 13

Preparation of the Dispersant According to the Invention (Copolymerization)

The dispersant is prepared in a similar way to what is indicated for example 7 but while employing the monomer mixture of example 6 and other monomers.

262 g of demineralized water are introduced into the reactor and then, after heating to approximately 80° C., the following are added separately:

- a mixture formed by 440 g of aqueous solution prepared according to example 6, 16.4 g of methacrylic acid; 14.0 g of methacrylic anhydride; and 2.2 g of Dynasylan® MTMO (3-mercaptopropyltrimethoxysilane) as functionalizing agent; and
- 14.1 g of an aqueous solution (10% weight/weight) of ammonium persulfate $(NH_4)_2S_2O_8$.

After 3 hours, the reaction is brought to completion by adding, all at once, 4.0 g of a 10% (m/m) ammonium persulfate solution and while maintaining the temperature at 80° C. for approximately 1 hour.

After cooling, the polymer solution has a content of dry matter of 36.0%. It is subsequently neutralized with a 30% aqueous sodium hydroxide solution (final content of dry matter: 35%).

The cement dispersant according to the present invention has a mass-average molecular mass of 118 000 and a peak value of 105 000, which shows that the methacrylic anhydride resists hydrolysis and that significant crosslinking has taken place.

Example 14

Preparation of the Dispersant According to the Invention (Copolymerization)

The dispersant is prepared in a similar way to what is indicated for example 8, except that a 10 liter reactor is used and the molar ratio of the monomers is changed (2:1 instead of 2.8:1).

2 565 g of demineralized water are introduced with stirring into the reactor, which has been preheated to 80° C. The following are introduced separately using pumps:

- 5 000 g of an aqueous solution prepared according to example 2;
- 87 g of methacrylic acid;
- 10 g of Dynasylan® MTMO as functionalizing agent; and
- 126 g of a 10% (m/m) aqueous ammonium persulfate $(NH_4)_2S_2O_8$ solution.

After 3 hours, the reaction is brought to completion by adding, all at once, 32 g of 10% (m/m) aqueous ammonium persulfate solution and while maintaining the temperature at 80° C. for approximately one hour.

After cooling, the polymer solution has a content of dry matter of 35%. It is subsequently virtually completely neutralized using a 30% aqueous sodium hydroxide solution (final content of dry matter: 35%).

The cement dispersant according to the present invention has a mass-average molecular mass of 84 000 with peak values of 90 000 and of 29 000.

The minislump test as defined above is subsequently carried out with the polymer solution. The results are recorded below in table 1.

In this table 1, the results shown were obtained according to the procedure of the minislump test described above and by monitoring the variations over time of the Theological properties of the suspension.

Of course, the greater the plasticity of the mixture, the greater the diameter of the paste.

Each of the figures shown in table 1 is the mean of two separate determinations carried out by preparing, on each occasion, the suspension mentioned in the procedure of the minislump test.

TABLE 1

| Product of example No. | Polymer/ cement ratio | t = 0 | t = 2 h | t = 4 h | t = 6 h | t = 8 h |
|---|---|---|---|---|---|---|
| 7 | 0.175 | 20 cm | 18 cm | 17.5 cm | 15 cm | 11 cm |
| 8 | 0.23 | 19 cm | 19 cm | 19 cm | 18 cm | |
| 10 | 0.175 | 19 cm | 16.5 cm | 14 cm | | |
| 11 | 0.175 | 20 cm | 19 cm | 18.5 cm | 17 cm | 14 cm |
| 12 | 0.23 | 20 cm | 21 cm | 20.5 cm | 20 cm | 19.5 cm |
| 13 | 0.23 | 21 cm | 21 cm | 20 cm | 19 cm | 16 cm |

It is thus found that the plasticity slowly decreases over time.

The dispersant of example 14 and commercial products are compared in table 2, the comparison being obtained with slump measurements according to the test with an Abrams cone described above.

TABLE 2

| Paste No. | 1 | 2 | 3 | 4 |
|---|---|---|---|---|
| Additive | None | Commercial product 1 (1) | Commercial product 2 (2) | Example 14 |
| Level of addition (%) | | 0.603 | 0.875 | 0.972 |
| W/C overall ratio | 0.655 | 0.607 | 0.553 | 0.564 |
| Slump t0 + 5 min | 20 | 20.5 | 21 | 21 |
| Slump t0 + 30 min | 16 | 19 | 18 | 21 |
| Slump t0 + 60 min | 13 | 14.5 | 17 | 18.5 |
| Slump t0 + 90 min | 11 | 14 | 9.5 | 17 |
| Density | 2.346 | 2.342 | 2.369 | 2.37 |
| Mechanical strength at 24 hours | 9.3 | 12.8 | 18.4 | 20.2 |
| Mechanical strength at 7 days | 25 | 35.4 | 39.7 | 39.5 |
| Mechanical strength at 28 days | 34.1 | 42.5 | 46.9 | 44.1 |

(1): Sold under the name Optima 100
(2): Sold under the name Malialim A 20

It clearly emerges that very good results in terms of maintenance of rheology (slump) and of mechanical properties (compressive test) are obtained.

What is claimed is:

1. A process for the preparation of a water-soluble acrylic copolymer comprising the following stages:

(i) preparation of at least one monomer (1) of formula

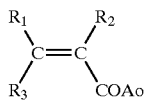

in which $R_1$, $R_2$ and $R_3$ are identical to or different from one another and can be a hydrogen atom or a methyl group;
   Ao is an —O(RtO)$_m$Rz or —NRp(RtO)$_m$Rz group, Rt being a saturated alkylene group having from 1 to 4 carbon atoms, Rz being a saturated alkyl group having from 1 to 6 carbon atoms and Rp being a hydrogen atom or a saturated alkyl group having from 1 to 8 carbon atoms; and m being an integer between 3 and 150;

by reaction of an excess of (meth)acrylic anhydride derivative (1') of formula

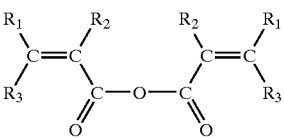

in which $R_1$, $R_2$ and $R_3$ are as defined above,
   with a compound of formula AoH, Ao being as defined above, (ii) copolymerization of said monomer (1) with at least one monomer (2) of (meth)acrylic acid or of a derivative of this acid, with the said excess of derivative (1') remaining after the reaction between derivative (1') and the compound AOH, being left during copolymerization stage ii).

2. The process as claimed in claim 1, in which the said excess of derivative (1'), left during copolymerization stage, is in the neutralized form, by neutral or basic hydrolysis before the copolymerization of stage (ii).

3. The process as claimed in claim 1, in which the said excess of derivative (1'), left during the copolymerization stage, is partially neutralized before this stage.

4. The process as claimed in claim 3, in which the excess of derivative (1') not neutralized before stage (ii) is neutralized after this stage.

5. The process as claimed in claim 1 wherein, in the monomer (1), m is greater than 10.

6. The process of claim 1 wherein, in the monomer (1), $R_1$ and $R_3$ are hydrogen atoms.

7. The process as claimed in claim 1 wherein the monomer (2) corresponds to the formula:

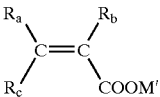

in which
$R_a$, $R_b$ and $R_c$ are identical to or different from one another and can be a hydrogen atom or a methyl group;
M' is a hydrogen atom, a metal from Group IA or IIA, an ammonium or an organic amine group.

8. The process of claim 1 wherein the monomer (2) is (meth)acrylic acid neutralized with a metal from Group IA or IIA.

9. The process as claimed in claim 1 wherein the ratio by weight of the monomer (1) to the monomer (2) is between 5:95 and 98:2.

10. The process as claimed in claim 1, wherein the copolymerization of stage (ii) is carried out in the presence of 0 to 20%, with respect to the total mass of the monomers (1), (2) and (3), of at least one other monomer (3) copolymerizable with the monomers (1) and (2).

11. The process as claimed in claim 1, wherein the monomer (3) is chosen from the group consisting of the following compounds:
(meth)acrylic anhydride,
(meth)acrylic esters of $C_1$ to $C_{20}$ aliphatic alcohols, maleic acid or its anhydride and their derivatives,
polyethoxy monoallyl ethers of formula $CH_2$=$CHCH_2O(C_2H_4O)_p$—R, in which p is between 5 and 100 and R is a $C_1$ to $C_4$ alkyl,
monounsaturated $C_3$ to $C_5$ sulfonic acids, and
compounds of formula $CH_2$=$CR_x$—CO-A-$CR_{x1}$—$CH_2R_{x2}$—$SO_3M$, in which M is as defined for the monomer (2), Rx is a hydrogen atom or a methyl, $R_{x1}$ and $R_{x2}$ are, independently of one another, a hydrogen atom or a $C_1$ to $C_8$ alkyl, and A is NH or N—$CH_3$.

12. The process as claimed in claim 1, wherein the copolymerization of stage (ii) is carried out in the presence of a chain-transfer agent of thiol type.

13. The process as claimed in claim 12, wherein the chain-transfer agent is a silanol functionalizing agent.

14. The process as claimed in claim 12, wherein the transfer agent is an agent of formula HS-Ro-Si—$(OR_{1a})$, in which $R_{1a}$ is H or a saturated $C_1$ to $C_3$ alkyl group and Ro is a linear or branched alkyl chain, or the said agent in mixture with $H_3PO_2$, $H_3PO_3$ or one of their salts.

15. The process as claimed in claim 5 where m is greater than 20.

16. The process as claimed in claim 9 wherein the ratio by weight of monomer (1) to monomer (2) is between 50:50 and 98:2.

* * * * *